United States Patent
Drane et al.

(10) Patent No.: US 8,527,924 B2
(45) Date of Patent: Sep. 3, 2013

(54) METHOD AND APPARATUS FOR PERFORMING FORMAL VERIFICATION OF POLYNOMIAL DATAPATH

(75) Inventors: Theo Alan Drane, London (GB); Freddie Rupert Exall, Watford (GB)

(73) Assignee: Imagination Technologies, Ltd., Kings Langley, Hertfordshire (GB)

( * ) Notice: Subject to any disclaimer, the term of this patent is extended or adjusted under 35 U.S.C. 154(b) by 0 days.

(21) Appl. No.: 13/441,543

(22) Filed: Apr. 6, 2012

(65) Prior Publication Data

US 2013/0152030 A1    Jun. 13, 2013

(30) Foreign Application Priority Data

Apr. 8, 2011 (GB) .................................. 1106055.5

(51) Int. Cl.
  *G06F 17/50* (2006.01)
(52) U.S. Cl.
  CPC ........ *G06F 17/5081* (2013.01); *G06F 17/5022* (2013.01); *G06F 17/505* (2013.01)
  USPC ........... 716/107; 716/103; 716/104; 716/111; 703/16
(58) Field of Classification Search
  CPC  G06F 17/505; G06F 17/5022; G06F 17/5081
  USPC .................... 716/107, 103, 104, 111; 703/16
  See application file for complete search history.

(56) References Cited

U.S. PATENT DOCUMENTS

| | | | |
|---|---|---|---|
| 8,046,739 B2 * | 10/2011 | Curtis et al. ................... | 717/113 |
| 2003/0163637 A1 * | 8/2003 | Villaret et al. ................ | 711/108 |
| 2008/0034345 A1 * | 2/2008 | Curtis et al. ................... | 717/100 |
| 2008/0294708 A1 * | 11/2008 | Rawlins et al. ............... | 708/314 |
| 2008/0301602 A1 | 12/2008 | Koelbl et al. | |
| 2009/0059331 A1 * | 3/2009 | Bogoni et al. ................. | 359/108 |

* cited by examiner

*Primary Examiner* — Phallaka Kik
(74) *Attorney, Agent, or Firm* — Michael S. Garrabrants; ArtesynIP, Inc.

(57) ABSTRACT

A method and apparatus are provided for use in synthesis of RTL integrated circuit design to determine the functional equivalence of designs. For example, the receiver receives a plurality of designs for synthesis in RTL and a data flow graph is derived for each design. Internal bit widths in the data flow graph representations are restricted (52) to provide a first modified version of each of the designs. These first modified versions are compared each with the design from which it was derived in a comparison unit (54). The input bit widths of the data flow graph representation are then restricted to be no wider than the output bit widths (56) to derive second modified versions of the designs (58). These second modified versions are compared with each other (60) to determine which are equivalent. Equivalent designs can be passed to an RTL synthesis unit 62, or otherwise further evaluated.

9 Claims, 4 Drawing Sheets

METHOD AND APPARATUS FOR PERFORMING FORMAL VERIFICATION OF POLYNOMIAL DATAPATH

CROSS REFERENCE TO RELATED APPLICATIONS

This application claims priority from Great Britain Patent Application Number 1106055.5, filed on Apr. 8, 2011, entitled "Method and Apparatus for Performing the Synthesis of Polynomial Datapath via Formal Verification", and which application is herein incorporated in its entirety herein for all purposes.

BACKGROUND

1. Field

One aspect relates to methods and apparatus for use in the design and manufacture of integrated circuits, and in particular to methods and apparatus for confirming that two designs are functionally equivalent for a method of synthesis.

2. Related Art

The task of confirming that two designs are identical is one that is extremely important in all areas of hardware design. To replace an existing design in a portion of an integrated circuit with another which exhibits desirable synthesis properties, for example, first requires that a level of confidence that the two designs are functionally equivalent be attained.

When modern integrated circuit (IC) designs are produced, these usually start with a high level design specification which captures the basic functionality required but does not include the detail of implementation. High level models of this type are usually written with high level programming language to derive some proof of concept and validate the model.

Once this has been completed, the model can be reduced to register transfer level using commercially available tools. The leading producer of such tools is Synopsys. Once an RTL model has been produced, it can go through a process of optimization to determine whether portions of the design can be implemented using fewer components and areas of silicon without changing the functionality of those portions.

Two common methods used to verify whether two designs are identical are simulation of designs and formal verification, i.e., the application of formal methods to prove properties of designs. Simulation is often used for larger and more complex designs as it can effectively be employed wherever simulation of the design is possible. However, due to the ever increasing size of the input space, and the difficulty in resolving corner cases for complex designs, the confidence gained from simulation alone is becoming less and less sufficient. Formal verification, on the other hand, gives absolute confidence but is limited in applicability to small or simple designs, due to the complexity of modelling and applying formal methods.

Recently there has been growing interest in the approach of combining formal and non-formal techniques, such as simulation, as surveyed in J. Bhadra, M. S. Abadir, L.-C. Wang, S. Ray, "A Survey of Functional Verification through Hybrid Techniques", IEEE Design & Test of Computers, March-April 2007. As demonstrated in Namrata Shekhar, Priyank Kalla, M. Brandon Meredith, and Florian Enescu "Simulation Bounds for Equivalence Verification of Polynomial Datapaths Using Finite Ring Algebra", IEEE Transactions of Very Large Scale Integration Systems, volume 16, No. 4, April 2008. Formal properties of particular datapath designs can be used to dramatically reduce the size of the input space for such designs, allowing exhaustive simulation to be used to prove equivalence.

Commercially available tools such as Synopsys' Formality, www.synopsys.com/tools/verification/formalequivalence/pages/formality.aspx can formally prove equivalence between many designs but do not incorporate the theory of polynomial rings to simplify the verification of polynomial-like designs. Tools of this type operate at bit level to confirm functional equivalence at RTL level. However, commercially available tools are frequently unable to prove equivalence of relatively trivial designs in a reasonable time period.

Formal verification of two IC designs is a common desire in order to improve the designs of IC's and to improve the efficiency of manufacture and is realizable due to the availability of commercial products. However, the power of formal verification tools is limited, meaning that designs over a certain size or complexity cannot be successfully verified against one another.

SUMMARY

The systems, software and methods presented here extend the capability of current formal verification tools and techniques such that they may be successfully applied to more complex or larger designs.

In one aspect, capabilities of currently available formal verification tools and techniques are extended so that they can be successfully used with more complex or larger designs. In particular, these embodiments use the recognition of polynomial datapath equivalence in portions of RTL designs to provide equivalence of a range of datapath designs.

Consider a situation where a design for part of an IC from which one or more equivalent variants have been derived. As part of a synthesis flow we would first need to establish which of the variants are functionally equivalent for all possible inputs. There are many documented algorithms for verifying whether two designs are functionally equivalent and indeed various commercial products. However, none of these formal methods are used in tandem with the input space reduction which arises from recognition of polynomial datapath. Once the variants that are functionally equivalent have been established, they would all be synthesized and the one with the most desirable IC properties would be utilized.

In accordance with one aspect, a method of determining functional equivalence of designs from RTL comprises receiving a plurality of equivalent designs for synthesis in RTL, and determining a data flow graph representation of each design. Each data flow graph representation has at least one input with an input bit width, at least one internal signal with an internal bit width, and at a least one output with an output bit width. A first modified version of each data flow graph representation is derived by restricting bit width for each said at least one internal signal to be equal to a largest output bit width of all the outputs, if said at least one internal signal is polynomial. The method comprises comparing each first modified design against the respective design from which it was derived to determine whether it is equivalent to the respective design from which it was derived. The input bit widths of said at least one input are restricted to derive second modified versions of each respective first modified version of a design determined to be functionally equivalent to the design from which it was derived. The second modified designs are compared or contrasted against each other to determine which are functionally equivalent. Any one or more (e.g., all) the designs determined to be functionally equivalent can be provided to an RTL synthesis unit.

In accordance with another aspect, a system for verifying equivalence among a plurality of designs, which can be used in RTL synthesis comprises a receiver for receiving a plurality of equivalent designs for synthesis in RTL and a data flow graph derivation unit for deriving a data flow graph representation of each design. Each data flow graph representation has at least one input with an input bit width, at least one internal signal with an internal bit width, and at least one output with an output bit width. The system comprises a data flow graph modification unit for deriving first modified versions of each data flow graph representation by restricting bit width for each said at least one internal signal to be equal to a largest output bit width of all the outputs, when said at least one internal signal is polynomial. The system also comprises a comparator for comparing each first modified design against the respective design from which it was derived to determine whether it is equivalent to the respective design for which it was derived, and an input bit width restricting unit to restrict the bit widths of said at least one input to derive second modified versions of each respective first modified version of a design to serve and be functionally equivalent to the design for which it was derived. The system also comprises a second comparator for comparing said second modified designs against each other to determine which are functionally equivalent and an output for providing any (one, more or all) designs determined to be functionally equivalent to an RTL synthesis unit.

In accordance with a further aspect, there is provided a non-transitory computer readable storage medium storing instructions which when executed by a computer causes the computer to perform a method for use in the synthesis of RTL integrated circuit design requiring the determining of functional equivalence of designs. The method comprises receiving a plurality of equivalent designs for synthesis in RTL and determining a data flow graph representation of each design. Each data flow graph representation has at least one input with an input bit width, at least one internal signal with an internal bit width, and at a least one output with an output bit width.

The method also comprises deriving first modified versions of each data flow graph representation by restricting bit width for each said at least one internal signal to be equal to a largest output bit width of all the outputs, where at least one internal signal is polynomial. The method also comprises comparing each first modified design against the respective design from which it was derived to determine whether it is equivalent to the respective design from which it was derived and restricting the input bit widths of said at least one input to derive second modified versions of each respective first modified version of a design determined to be functionally equivalent to the design from which it was derived. The method comprises comparing said second modified designs against each other to determine which are functionally equivalent and providing any designs determined to be functionally equivalent to an RTL synthesis unit.

BRIEF DESCRIPTION OF THE DRAWINGS

Various aspects of the disclosure and implementations thereof will now be described in more detail by way of example with reference to the accompanying drawings in which.

DETAILED DESCRIPTION

Embodiments as described below provide a method apparatus and software for easing the formal verification between two designs A and B as part of a synthesis flow. By applying results regarding polynomial datapath, it is possible to show that a verification between two modified designs, A' and B', which are copies of A and B except that their input widths are smaller, is enough to show equivalence between A and B.

This approach means that the formal verification tools need only deal with smaller designs to prove equivalence in larger designs thereby enabling them to prove equivalence between designs which otherwise may prove too complex.

Integer adders and multipliers are polynomial, but the vast majority of industry standard datapath does not fall into this category. However, many common operators and number formats are in fact polynomial in nature. To illustrate, consider two designs, A and B, which we wish to formally verify against each other. For the requirement to make sense both designs A and B must share common output widths.

For a design of output bit-width n we say that the behaviour of the design is polynomial for a particular input if the calculation performed can be written as a polynomial on an unsigned input with integer coefficients, reduced modulo $2^n$. For example, let $$Y_1[3:0] = a[1:0] * b[1:0] = ab \bmod 2^4$$

$$Y_2[0:0] = (a[1:0] > b[0:0])?1:0$$
$$= (a(a-1)(7-2a)/6 + \quad \text{(formulation 1)}$$
$$\quad a(a-2)(a-3)(1-b)/2) \bmod 2$$
$$= (a[1] + a[0] - a[1]a[0] - a[0]b + \quad \text{(formulation 2)}$$
$$\quad a[0]a[1]b) \bmod 2$$

$$Y_3[3:0] = a[1:0] << b[1:0] = a(3b[1]+1)(b[0]+1) \bmod 2^4$$

TABLE 1

| Design | Polynomial on inputs? |
| --- | --- |
| $Y_1$ | all of a, b |
| $Y_2$, formulation 1 | Not polynomial in a and b |
| $Y_2$, formulation 2 | all of b and individual bits of a |
| $Y_3$ | all of a and individual bits of b |

We see from table 1 that an operation can be formulated in different ways, the first formulation of $Y_2$ shows that it is not polynomial in a and b because the resultant polynomial does not have integer coefficients. However the second formulation of $Y_2$ shows that it is polynomial in the bits of the input a and b.

For ease of discussion if an operation is polynomial in only the individual bits of an input we may say that it is non-polynomial on that input. We may say however that $Y_3$ is non-polynomial on b, for example, but polynomial in b[0] and b[1].

Further, it is important to note that all operations are polynomial on at least the individual input bits. This is confirmed by the fact that any logic operation may be constructed purely from NAND gates. As $$a \text{ NAND } b = 1 - ab$$

Therefore the NAND gate is polynomial, so all things constructed from the NAND gate must also be polynomial on the input bits i.e. all datapath is polynomial at least in its input bits. The theory behind embodiments, which take advantage of the fact that all datapath is polynomial in at least its input bits is now shown below.

Theorem 1: For multivariate polynomials $P_1$ and $P_2$ with m unsigned integer inputs on domain D, bit widths $w_j$.

$$P_1(\underline{x}) \equiv P_2(\underline{x}) \bmod 2^n \; \forall \underline{x} \in D \Leftrightarrow P_1(\underline{x}) \equiv P_2(\underline{x}) \bmod 2^n \; \forall \underline{x} \in D \cap [0, SF(2^n)-1]^m$$

Where SF is the Smarandache function $SF(n) = \min(k : k! \geq n)$
Which can be computed via $SF(2^n) = \min(k : n \leq k - Hamm(k))$
Where $Hamm(k)$ is the Hamming weight of k, see Appendix A for proof
Proof: see [2].
Corollary 1: Letting $\lambda_j = \min(w_j, \text{ceil}(\log_2(SF(2^n))))$ $$P_1(\underline{x}) \equiv P_2(\underline{x}) \bmod 2^n \; \forall \underline{x} \in D \Leftarrow P_1(\underline{x}) \equiv P_2(\underline{x}) \bmod 2^n$$
$$0 \leq x_j < 2^{\lambda_j}$$

Proof : The domain on the right hand side is a superset of theorem 1:

$$0 \leq x_j < 2^{\lambda_j}$$

$$0 \leq x_j < 2^{\min(w_j, \text{ceil}(\log_2(SF(2^n))))}$$

$$0 \leq x_j < \min(2^{w_j}, 2^{\text{ceil}(\log_2(SF(2^n)))}) \Rightarrow$$
$$\underline{x} \in D \cap [0, SF(2^n)-1]^m$$

Hence restricting the widths to $\lambda_j$ is sufficient to prove equivalence of the $P_1$ and $P_2$.
Corollary 2: For designs with r outputs, each of bit width $n_i$ $$P_1^i(\underline{x}) \equiv P_2^i(\underline{x}) \bmod 2^{n_i} \; \begin{array}{c} 1 \leq i \leq r \\ \forall \underline{x} \in D \end{array} \Leftarrow P_1(\underline{x}) \equiv P_2(\underline{x}) \bmod 2^{n_i} \; \begin{array}{c} 1 \leq i \leq r \\ \forall \underline{x} \in D \cap [0, SF(2^{\max(n_i)}) - 1]^m \end{array}$$

Proof:

$$P_1^i(\underline{x}) \equiv P_2^i(\underline{x}) \bmod 2^{n_i} \; \forall \underline{x} \in D \Leftrightarrow P_1(\underline{x}) \equiv P_2(\underline{x}) \bmod 2^{n_i} \; \forall \underline{x} \in D \cap [0, SF(2^{n_i})-1]^m$$

Taking the union over the right hand side domains proves the result.

Hence using $\lambda_j = \min(w_j, \text{ceil}(\log_2(SF(2^{\max(n_i)}))))$ for input bit widths is sufficient to prove equivalence.

Corollary 2 underpins the method employed here by translating theorem 1, a result concerning test vectors, into a result discussing bit-widths of inputs to designs. Importantly, typical tools of formal verification can still be employed after applying this result, giving a cumulative benefit.

2 Internal Bit-Widths

It is possible in certain situations that a design fails to be polynomial in its word level inputs due to the bit-widths of intermediate signals. For example, consider the design:

$$T[14:0] = a[7:0] * b[7:0]$$

$$Y[15:0] = T$$

This contains only polynomial operations and yet isn't polynomial modulo $2^{16}$ in a and b.

If the output signal of a polynomial design is n bits wide then the result of every internal operation can be computed modulo $2^n$.

For example, consider $$P(\underline{x}) = (p(\underline{x})q(\underline{x}) + r(\underline{x})) \bmod 2^n$$
$$= ((p(\underline{x}) \bmod 2^n)(q(\underline{x}) \bmod 2^n) + (r(\underline{x}) \bmod 2^n)) \bmod 2^n$$

So if a design's functionality is unchanged by setting all internal bit widths to that of the output then the internal bit widths are such that they do not introduce non-polynomial effects into an otherwise polynomial design. Therefore adjusting all internal bit widths to that of the output will ensure that design is polynomial.

This observation extends to designs with multiple outputs. If an internal signal is involved in the calculation of a number of outputs, the internal signal must be the width of the maximum width of those outputs to ensure that the bit-width of the internal signal does not affect the polynomial nature of the design.

These observations of polynomials reduced modulo n can be interpreted in a more intuitive manner: if any intermediate calculation of a design produces information which resides in bits of position greater than n, then this information cannot influence the information held in the bits of position less than or equal to n if only polynomial behaviour is exhibited. For the information in these high bits (of bit position greater than n) to affect bits of lower position a non-polynomial operation, such as a right shift, would have to be performed.

From the above observations we have demonstrated that a method exists for eliminating the influence of bit-width when testing for polynomial design: given a starting design, A, we form A' which is identical, except that all internal signals have the width of the widest output. A passing verification between A and A' shows that the internal signal widths of A have no influence on whether the design is polynomial or not. A failing verification gives that A is not polynomial in its inputs due to internal signal width.

3 Data-Flow Graph and Verification Methodology

As discussed above polynomial datapath covers a significant amount of datapath designs. Furthermore, formally proving that two polynomial designs are equivalent only requires the checking of a reduced set of inputs. Implementations of the disclosure practically apply this realization and can use existing formal equivalent checking tools to provide significant orders of magnitude improvement in verification run times.

In order to implement the verification methodology, the first stage is to establish in which way two designs are polynomial and then to perform a traditional formal verification but with reduced bit widths. There is no requirement to form the polynomial description of the designs in question, only to establish the polynomial nature of the inputs.

To assess the polynomial nature of a datapath design, we first form an augmented data-flow graph (DFG). As all internal bit widths are assumed to be n, then this information is not required for the DFG.

Figure 1:
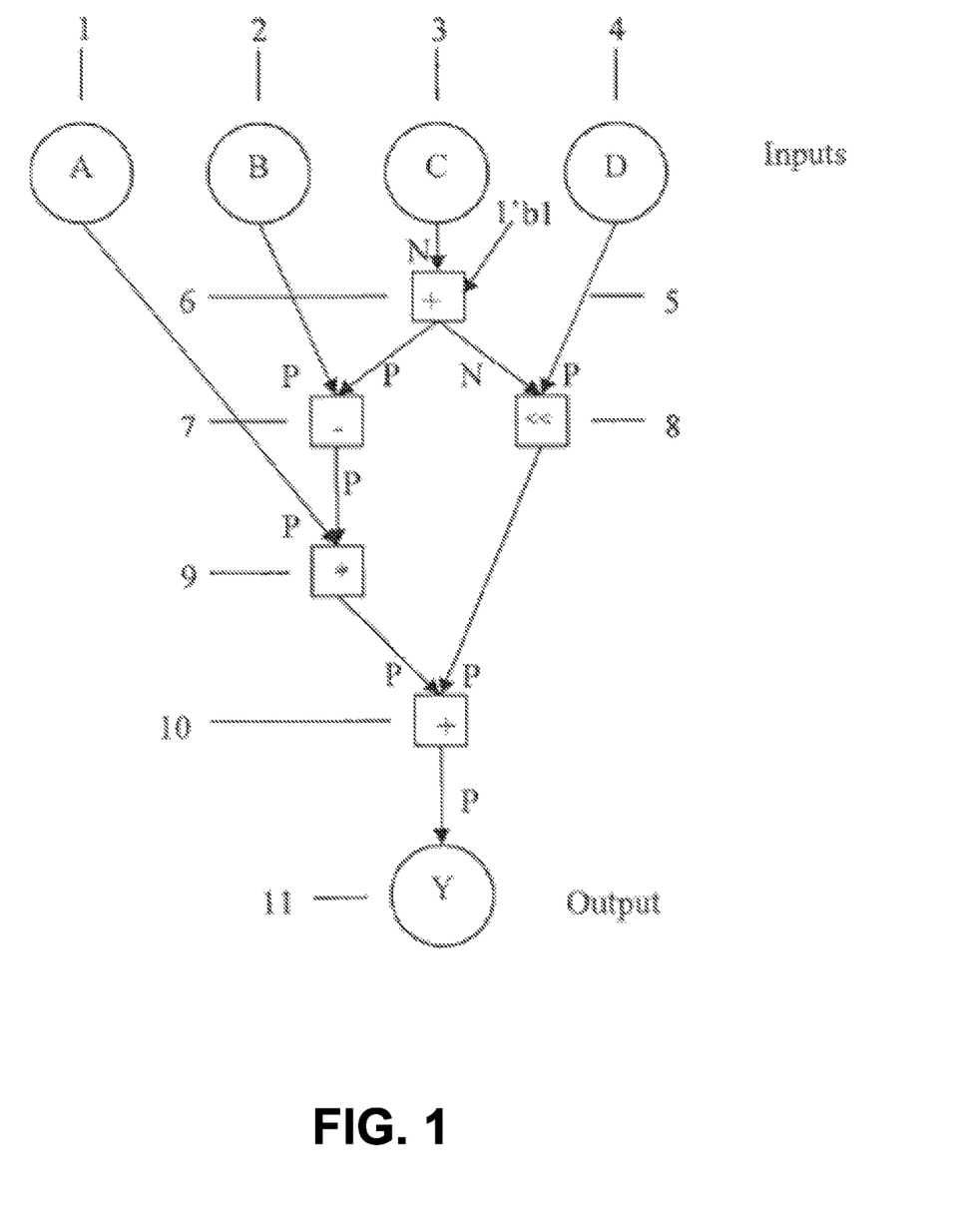
FIG. 1 shows a data flow graph illustrating polynomial behaviour of a design.

As shown by FIG. 1, we create a directed graph whose vertices are the inputs (1,2,3,4), outputs (11), and operators (6-10) of the design in question. The edges (5) of the directed graph correspond to the interconnecting signals of the design, connecting inputs, outputs, and operators as necessary, with the appropriate direction.

Each operator node will have a known polynomial behaviour, e.g.

where P/N labels polynomial/non polynomial respectively. Multiplication is polynomial in both inputs. Left shift is polynomial in the shifted value but non polynomial in the shift value. Comparison is non polynomial in both inputs. Using the polynomial nature of each operation, the polynomial nature of the whole design can be realised.

In order to label every edge as N or P we perform algorithm 1:

---
Inputs: Data Flow Graph and pre calculated operator polynomial behaviour
Output: Labelled Data Flow Graph and Inputs
Step 1: Label the outputs as 'P'
Step 2: For every node for which all outputs are labelled then
   If all outputs are labelled 'P'
   Then label the inputs as per the known operator's polynomial behaviour
   Else label all the inputs as 'N'
Step 3: Repeat Step 2 until all edges are labelled
Step 4: If all edges from an input are labelled 'P'
   Then label the input 'P'
   Else label the input 'N'

---

Hence we have a method of determining whether each input is treated in a polynomial manner, or not, by the design, and are able to produce an augmented dataflow graph of the type shown in FIG. 1.

4 Final Waterfall Verification

Figure 2:
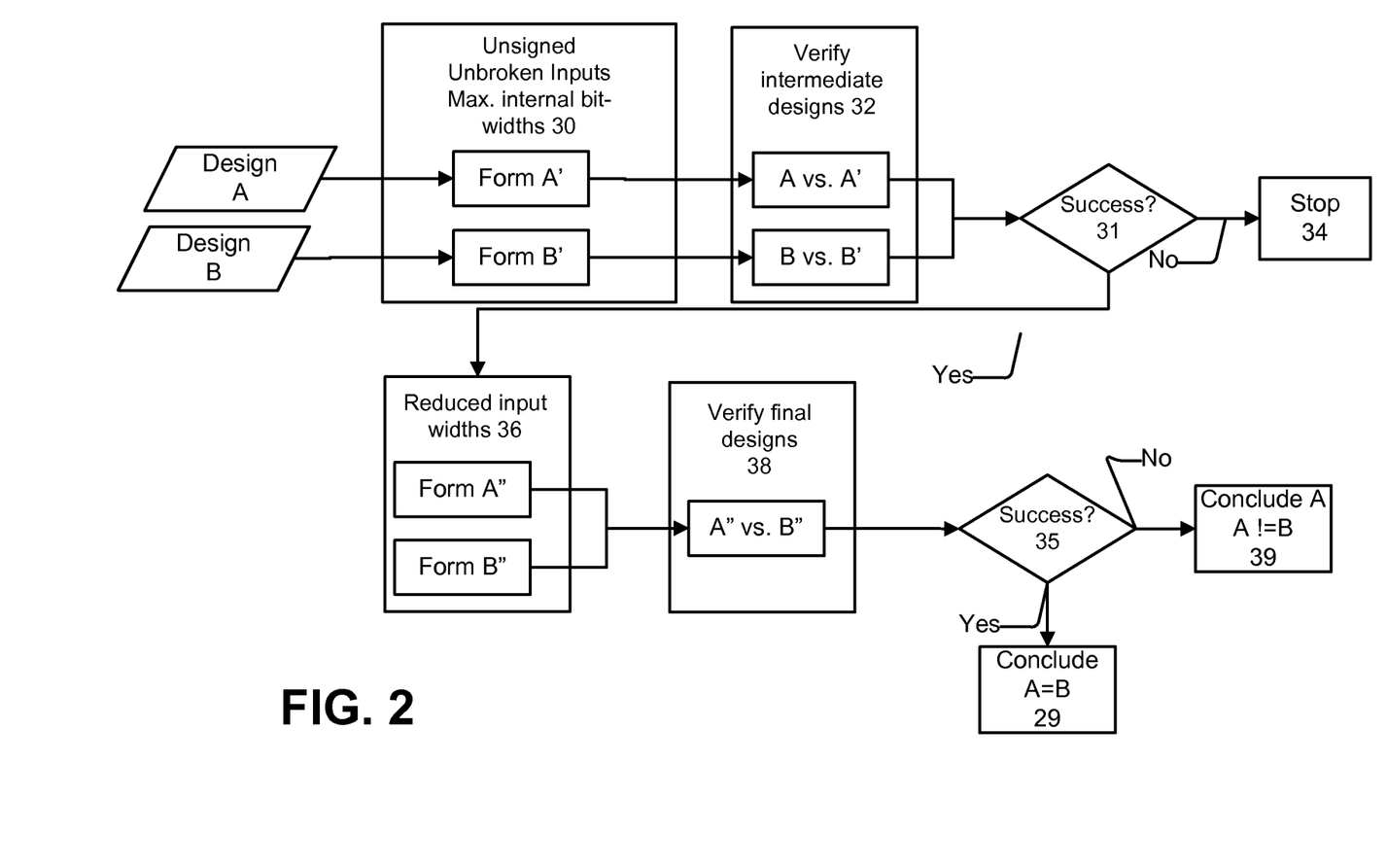
FIG. 2 is an example flow diagram showing how two designs are tested against each other.
Figure 3:
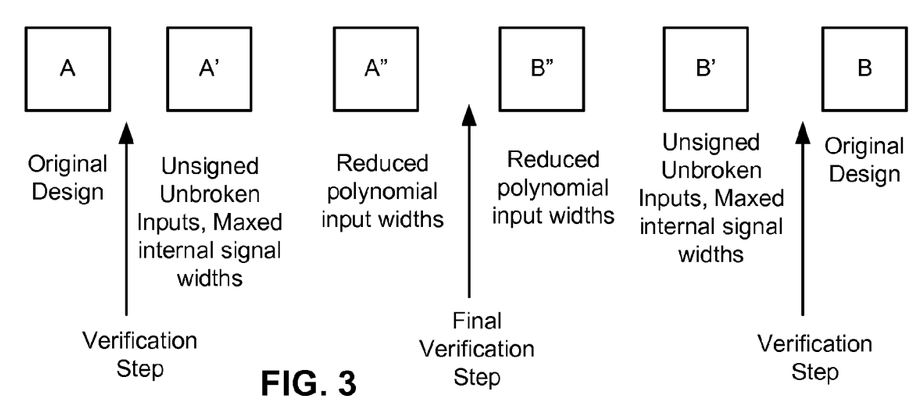
FIG. 3 illustrates an example verification process of a method applied to a given set of designs, e.g., designs A and B.

The complete method for verification is shown in the flow chart found in FIG. 2. FIG. 3 illustrates in more detail the verification process of this method applied to designs A and B.

A. The first step is to produce designs A' and B' from A and B and from which a DFG can be created as described above by restricting internal bit widths 30. The resultant DFG has unsigned inputs, all internal signals are of bit width n and no inputs are bit sliced during creation of the DFG. If a signal is sliced in two during the design, then two inputs are created. If an input is in floating point format, then it will need to be split into sign, exponent and mantissa. Sign magnitude inputs will need their most significant bit separated into a new input. Twos complement signed numbers will similarly need their most significant bit separated into a new input. The result should be designs A' and B' whose inputs are unsigned, whose internal bit widths all equal the largest output bit width and where inputs are used in their entirety without being bit sliced. If the inputs to A' and B' now differ, the fewest number of new inputs are created such that no bit splicing occurs in the two designs. A formal verification using the standard tools is then performed between A and A' as well as between B and B' 32. If either of these fail then the design is not applicable to the given verification 34.

B. Secondly create a DFG from A' and B', apply Algorithm 1 to each DFG. The inputs which have been labelled as 'P' on both DFGs are then defined as strictly polynomial.

C. For each strictly polynomial input with width $w_j$ compute $\lambda_j = \min(w_j, \text{ceil}(\log_2(SF(2^n))))$ where n is the maximum output width and $SF(2^n) = \min(k: n \leq k - \text{Hamm}(k))$ D. Create A" and B" 36 which are identical to A' and B' except for the fact that the strictly polynomial inputs are reduced in size to their corresponding width $\lambda_j$. If the verification between A" and B" succeeds then the designs A and B are formally equivalent 38, otherwise they are not 39.

Worked examples of this are as follows:

EXAMPLE 1

Design A:

$t0[8:0] = c[7:0] + 1$ $t1[15:0] = b[7:0] - t0$ $t2[15:0] = d[7:0] \ll t0$ $t3[15:0] = a[7:0] * t1$ $Y[15:0] = t3 + t2$

Design B:

$t0[8:0] = c[7:0] + 1$ $t1[15:0] = d[7:0] \ll c[7:0]$ $t2[15:0] = a[7:0] * b[7:0]$ $t3[15:0] = a[7:0] * t0$ $Y[15:0] = t2 - t3 + t1 + 2 * d[7:0]$

Design A':

$t0[15:0] = c + 1$ $t1[15:0] = b - t0$ $t2[15:0] = d \ll t0$ $t3[15:0] = a * t1$ $Y[15:0] = t3 + t2$

Design B':

$t0[15:0] = c + 1$ $t1[15:0] = d \ll c$ $t2[15:0] = a * b$ $t3[15:0] = a * t0$ $Y[15:0] = t2 - t3 + t1 + 2 * d$

The DFG of A' can be found in FIG. 1. The strictly polynomial inputs are a, b and d. In this case n=16, so $SF(2^{16}) = \min(k: 16 \leq k - \text{Hamm}(k)) = 18$; $\lambda_j = \min(8, \text{ceil}(\log_2(SF(2^{16})))) = 5$ Design A":

$t0[15:0] = c[7:0] + 1$ $t1[15:0] = b[4:0] - t0$ $t2[15:0] = d[4:0] \ll t0$

-continued $t3[15:0] = a[4:0] * t1$ $Y[15:0] = t3 + t2$

Design B":

$t0[15:0] = c[7:0] + 1$ $t1[15:0] = d[4:0] \ll c[7:0]$ $t2[15:0] = a[4:0] * b[4:0]$ $t3[15:0] = a[4:0] * t0$ $Y[15:0] = t2 - t3 + t1 + 2 * d[4:0]$

Formally verifying A" against B" is a much simpler verification than A against B.

Note that in general $SF(2^n)$ is of order n, thus reducing exponential complexity to linear complexity.

EXAMPLE 2

The following is a typical example in the context of an integer arithmetic logic unit.

$t0[33:0] = a[1'5:0] * b[15:0] + c[15:0]$ $t1[33:0] = -a[1'5:0] * b[15:0] + c[15:0]$ $t2[33:0] = a[1'5:0] * b[15:0] - c[15:0]$ $t3[33:0] = -a[1'5:0] * b[15:0] - c[15:0]$ $t4[33:0] = a[1'5:0] * b[15:0]$ $t5[33:0] = -a[1'5:0] * b[15:0]$ $t6[33:0] = c[15:0]$ $t7[33:0] = -c[15:0]$ $$\text{Design A: } Y[33:0] = \begin{matrix} (s == 0)?\ t0: \\ (s == 1)?\ t1: \\ (s == 2)?\ t2: \\ (s == 3)?\ t3: \\ (s == 4)?\ t4: \\ (s == 5)?\ t5: \\ (s == 6)?\ t6: \\ t7 \end{matrix}$$

$t0[33:0] = (s > 5)?\ 0 : b[15:0]$ $t1[33:0] = (s < 4)?\ c[15:0] : (s[1] == 1)?\ c[15:0] : 0$

Design B: $t3[33:0] = (s[2] \oplus s[1] \oplus s[0] == 1)?\ \overline{t1} : t1$ $t4[33:0] = a[15:0] * t0 + t3 + (s[2] \oplus s[1] \oplus s[0]) - s[0]$ $Y[33:0] = s[0]?\ \overline{t4} : t4$ Design A' = Design A : Design B' = Design B By applying Algorithm 1 the strictly polynomial inputs are a, b and c.

Figure 4:
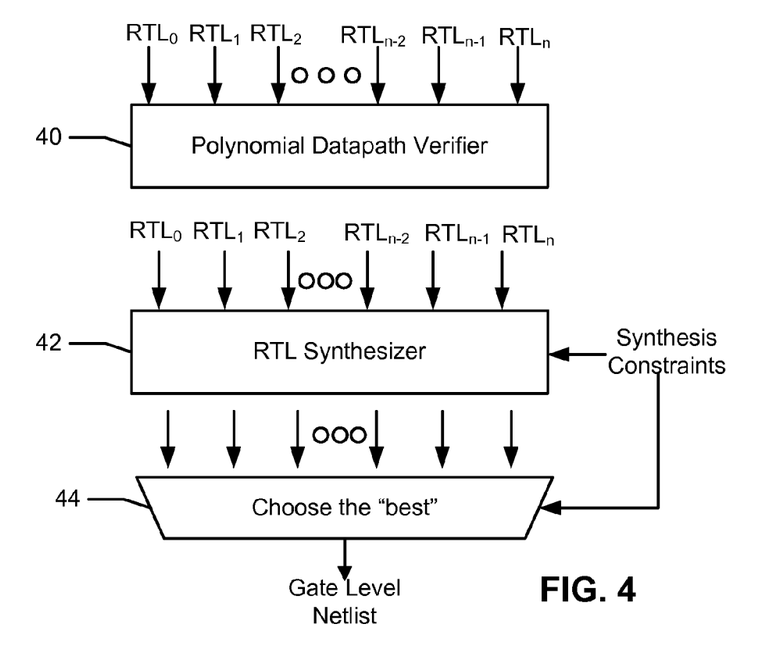
FIG. 4 illustrates an example of how the verification process can be embedded within a synthesis tool for polynomial datapath.

In this case n = 34, so $SF(2^{34}) = \min(k : 34 \leq k - Hamm(k)) = 36$ $\lambda_j = \min(16, \text{ceil}(\log_2(SF(2^{34})))) = 6$ 5 Polynomial Synthesis Via Formal Verification The above methodology can improve or optimize verification of polynomial datapath design. In practical terms, when used in IC design verification can be implemented using standard synthesis tools. A modified synthesis tool is therefore shown. An example of implementing the modified synthesis tool in practice is illustrated in FIG. 4.

A design imbedded in RTL ($RTL_0$) is presented to a polynomial datapath verifier 40 along with a desired number of variants on this ($RTL_1$, $RTL_2$ ... ). The polynomial datapath verifier 40 then tests for functional equivalence between each variant and the original $RTL_0$ using the methodology described above and in particular the method steps of FIG. 2 using the DFG representations of each design as inputs to this.

Each variant which is found to be functionally equivalent is passed to a standard RTL synthesizer 42 which also has input constraints providing by a user. The results of each functionally equivalent variant of the RTL design is then compared against the users synthesis constraints in a selection unit 44. The output of this is then a gate level net list for the RTL variant which is best suited to fulfill the user's requirements. This netlist can then be implemented at chip level.

In the polynomial datapath verifier 40, the methodology of e.g. FIG. 2 and FIG. 33 is followed. In this figure, if we consider design A and design B to be substituted with $RTL_0$ and $RTL_1$, then at 20, the bit widths of $RTL_0$ and $RTL_1$, are constrained to be equivalent to be the same as the output bit widths. This gives variants on $RTL_0$ and $RTL_1$. At 22 $RTL_0$ and $RTL_1$, are then verified against their intermediate variants. If this is determined to succeed at 24, second variants of $RTL_0$ and $RTL_1$, are produced in which any strictly polynomial inputs are reduced in size to the bit width of the output at 20. A further verification takes place at 28 and from the result of this it can be determined whether or not the two input designs $RTL_0$ and $RTL_1$, are equivalent. This is achieved by comparing the result of the verification 28 at 30. If the verification is successful then it is concluded that the two designs are equivalent and whichever one best fits the users constraints can then be selected at the output of the RTL synthesis unit.

Thus, embodiments provide a practical improvement in the formal verification of RTL designs through formal verification tools which leads to orders of magnitude improvement in execution time when formal verification takes place. This enables much more complex designs to go through formal verification than has previously been the case.

Figure 5:
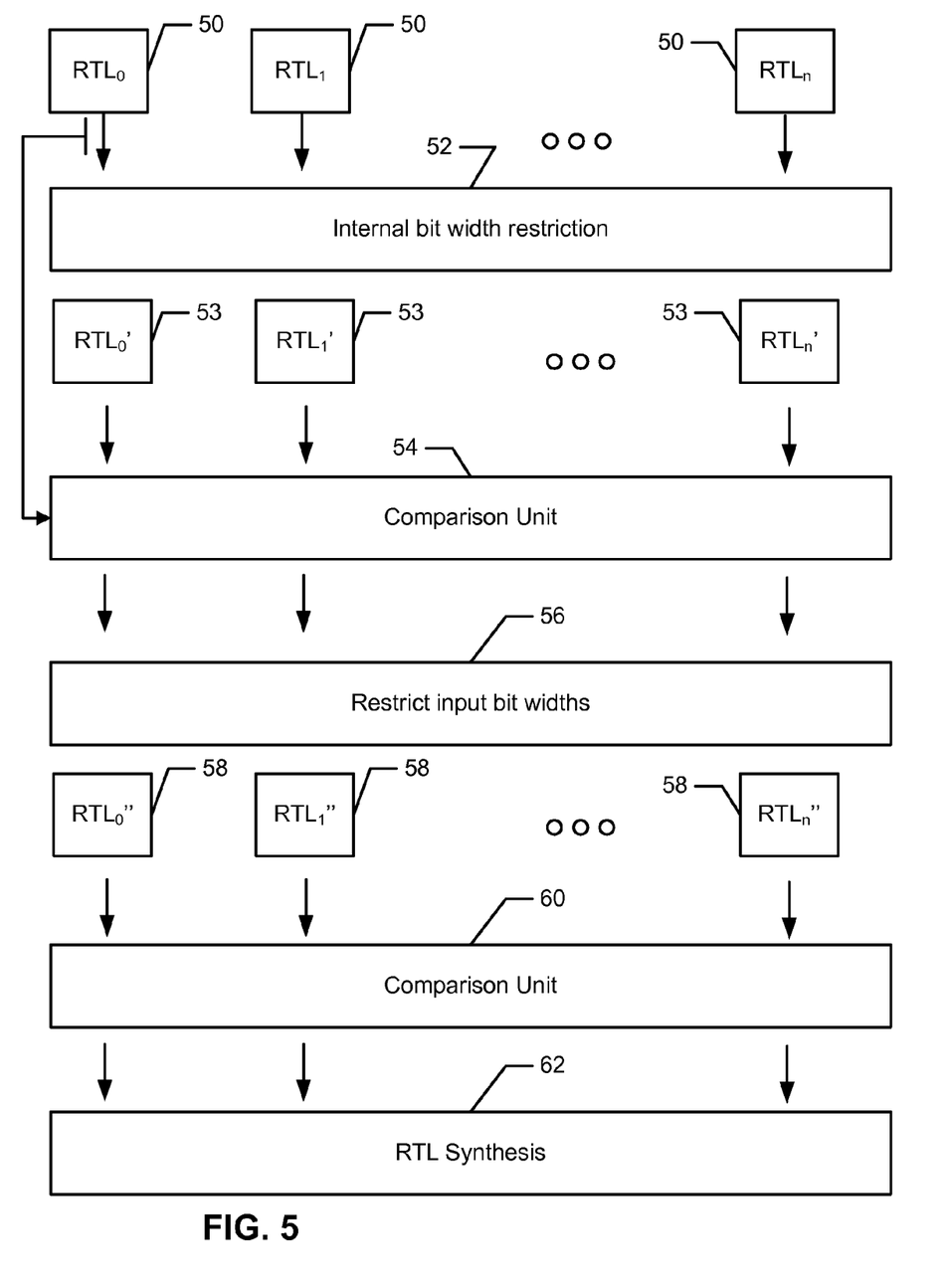
FIG. 5 shows a schematic block diagram of the verification portion of FIG. 4.

FIG. 5 is a schematic block diagram of the verification portion of FIG. 4. It shows at its input an array of data flow graph derivation units which receive inputs $RTL_0$ ... $RTL_n$. These each derive a data flow graph representation of the functionality of a design and each of the variants produced. This data flow graph representation will be of the form illustrated in FIG. 1, dependent upon exact functionality.

These data flow graph representations are provided to an internal bit width restriction unit 52 and to a comparison unit 54. The internal bit width restriction unit 52 provides modified versions of each design which are stored in buffering units 54 as $RTL_1'$ ... $RTL_n'$. The original designs and their bit width restricted versions are then compared against each other RTL0' against RTL0' etc in comparison unit 54 and those which are found to be functionally equivalent are passed to a second bit width restriction unti 56 which restricts the input bit widths to each data flow graph design it receives. This results in a second modified version of each design RTL0" ... $RTL_n"$ which are stored in buffer units 58.

A second comparison unit 60 then receives each of the further modified designs and compares each against RTL0" to determine if they are equivalent. If they are equivalent then they can be passed to the RTL synthesis unit 62, which, as shown in FIG. 4 also receives user constraints. Each design which is equivalent can then be tested against user constraints to determine which provides the optimal implementation. That design can then be used to produce a net list of gates for implementing the design in any IC.

Alternative Implementations

In this description, exemplary designs with reduced input width have been used, however one may perform the final verification by verifying A' against B' while restricting the domain of the verification to $x \in \bar{D} \cap [0, SF(2^{max(n_i)})-1]^m$.

Further the algorithm above can be applied to a hierarchical verification of designs A and B. So part of the designs may exhibit a greater polynomial than others, as such, may be more amenable to this verification procedure.

Implementations can be provided in dedicated hardware or firmware, or in software running on general purpose processing devices, or combinations thereof. The equivalence checking may be provided as an integrated portion of an RTL synthesis unit, or as part of the verification process. Computationally, it is more efficient to be provided as part of the verification process.

If implemented in firmware and/or software, the functions may be stored as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

Appendix A $$SF(2^n) = \min(k : 2^n \mid k!)$$
$$= \min(k : n \leq gcd(2^k, k!))$$
$$= \min\left(k : n \leq gcd\left(2^k, \left(\sum_i 2^i k[i]\right)!\right)\right)$$
$$= \min\left(k : n \leq \sum_i k[i] gcd(2^k, 2^i!)\right)$$
$$= \min\left(k : n \leq \sum_i k[i](2^i - 1)\right)$$

$$SF(2^n) = \min(k : n \leq k - Hamm(k))$$

Where Hamm(k) is the Hamming weight of k, i.e. the number of ones found in the binary form of k.

The invention claimed is:

1. A machine implemented method for use in synthesis of an integrated circuit design, comprising:
   receiving a plurality of equivalent designs for synthesis in RTL;
   determining a data flow graph representation of each design, each data flow graph representation having at least one input with an input bit width, at least one internal signal with an internal bit width, and at a least one output with an output bit width;
   deriving first modified versions of each data flow graph representation by restricting bit width for each said at least one internal signal to be equal to a largest output bit width of all the outputs, when said at least one internal signal is polynomial;
   comparing, in one or more computers, each first modified design against the respective design from which it was derived to determine whether it is equivalent to the respective design from which it was derived;
   restricting the input bit widths of said at least one input to derive second modified versions of each respective first modified version of a design determined to be functionally equivalent to the design from which it was derived;
   comparing, in one or more computers, said second modified designs against each other to determine which second modified designs are functionally equivalent; and
   providing any one or more designs determined to be functionally equivalent to an RTL synthesis unit.

2. A method according to claim 1 further comprising synthesising the designs determined to be functionally equivalent in the RTL synthesis unit.

3. A method according to claim 2 further comprising testing designs determined to be equivalent against user determined constraints to determine an optimal implementation.

4. A method according to claim 3 further comprising providing a net list of gates for implementing a design in an integrated circuit as an output of synthesis.

5. An apparatus for synthesising an integrated circuit design comprising:

a receiver for receiving a plurality of equivalent designs for synthesis in RTL;

a data flow graph derivation unit configured for deriving a data flow graph representation of each design, each data flow graph representation having at least one input with an input bit width, at least one internal signal with an internal bit width, and at least one output with an output bit width;

a data flow graph modification unit configured for deriving first modified versions of each data flow graph representation by restricting bit width for each said at least one internal signal to be equal to a largest output bit width of all the outputs, when said at least one internal signal is polynomial;

a comparator configured for comparing each first modified design against the respective design from which it was derived to determine whether it is equivalent to the respective design for which it was derived;

an input bit width restricting unit configured to restrict the bit widths of said at least one input to derive second modified versions of each respective first modified version of a design determined to be functionally equivalent to the design for which it was derived;

a second comparator configured for comparing said second modified designs against each other to determine which second modified designs are functionally equivalent; and an output configured for providing any designs determined to be functionally equivalent to an RTL synthesis unit.

6. The apparatus according to claim 5 in which the RTL synthesis unit is configured to synthesize a design determined to be equivalent.

7. The apparatus according to claim 6, further comprising a test unit configured for receiving user constraints and to test synthesised designs against said user constraints to determine an optimal implementation.

8. The apparatus according to claim 7 in which the RTL synthesis unit is configured to produce a net list of gates for implementing the design in an integrated circuit.

9. A non-transitory computer readable storage medium storing instructions which when executed by a computer causes the computer to perform a method for use in synthesis of an integrated circuit design, the method comprising:

receiving a plurality of designs for synthesis in RTL;

determining a data flow graph representation of each design, each data flow graph representation having at least one input with an input bit width, at least one internal signal with an internal bit width, and at a least one output with an output bit width;

deriving first modified versions of each data flow graph representation by restricting bit width for each said at least one internal signal to be equal to a largest output bit width of all the outputs, when said at least one internal signal is polynomial;

comparing each first modified design against the respective design from which it was derived to determine whether it is equivalent to the respective design from which it was derived;

restricting the input bit widths of said at least one input to derive second modified versions of each respective first modified version of a design determined to be functionally equivalent to the design from which it was derived;

comparing said second modified designs against each other to determine which second modified designs are functionally equivalent; and providing any one or more of the designs determined to be functionally equivalent to an RTL synthesis unit.

* * * * *